United States Patent [19]

Nosse et al.

[11] 4,145,271

[45] Mar. 20, 1979

[54] METHOD FOR REGENERATING OXIDIZED PHOTOGRAPHIC DEVELOPERS

[75] Inventors: Yoshinori Nosse; Tomoyoshi Ono, both of Hino; Hideaki Suzuki, Machida; Takezo Ono, Kodaira; Seiki Iribe; Mineo Watanabe, both of Mihara, all of Japan

[73] Assignee: Teijin Limited, Osaka, Japan

[21] Appl. No.: 838,971

[22] Filed: Oct. 3, 1977

[30] Foreign Application Priority Data

| | | | |
|---|---|---|---|
| Oct. 12, 1976 | [JP] | Japan | 51-121324 |
| Jun. 23, 1977 | [JP] | Japan | 52-73890 |
| Jul. 14, 1977 | [JP] | Japan | 52-83606 |

[51] Int. Cl.$^2$ .......................... B01D 13/02; C02C 5/12

[52] U.S. Cl. ................................ 204/180 P; 204/151; 204/301

[58] Field of Search .................... 204/180 P, 151, 109, 204/46 R, 94, 111, 13

[56] References Cited

U.S. PATENT DOCUMENTS

| | | | |
|---|---|---|---|
| 2,827,428 | 3/1958 | Noble | 204/180 P |
| 3,647,422 | 3/1972 | Wainer | 204/180 P X |
| 3,926,759 | 12/1975 | Horn et al. | 204/180 P |
| 3,998,710 | 12/1976 | Itai et al. | 204/149 X |
| 4,013,527 | 3/1977 | Idota et al. | 204/149 X |

OTHER PUBLICATIONS

Priesthoff et al., Jrnl. of the SMPTE, 65, Sep. 1956, pp. 478–484.

Priesthoff, Jrnl. of the SMPTE, 66, Feb. 1957, pp. 64 & 65.

Mizusawa et al., Bulletin of the Society of Scientific Photography of Japan, 18, Dec. 1968, pp. 38–44.

*Primary Examiner*—Arthur G. Prescott
*Attorney, Agent, or Firm*—Wenderoth, Lind & Ponack

[57] ABSTRACT

A method for regenerating an oxidized photographic developer, which comprises bringing the oxidized photographic developer into contact with an adsorbent material which has affinity for the oxidation product of the developing agent or its derivatives and is substantially insoluble in the developer, and a method for regenerating an oxidized photographic developer, which comprises subjecting the oxidized developer to a contacting treatment with an adsorbent material which has affinity for the oxidation product of the developing agent or it derivatives and is substantially insoluble in the developer, and to an electrodialysis treatment using ion exchange membranes.

5 Claims, 1 Drawing Figure

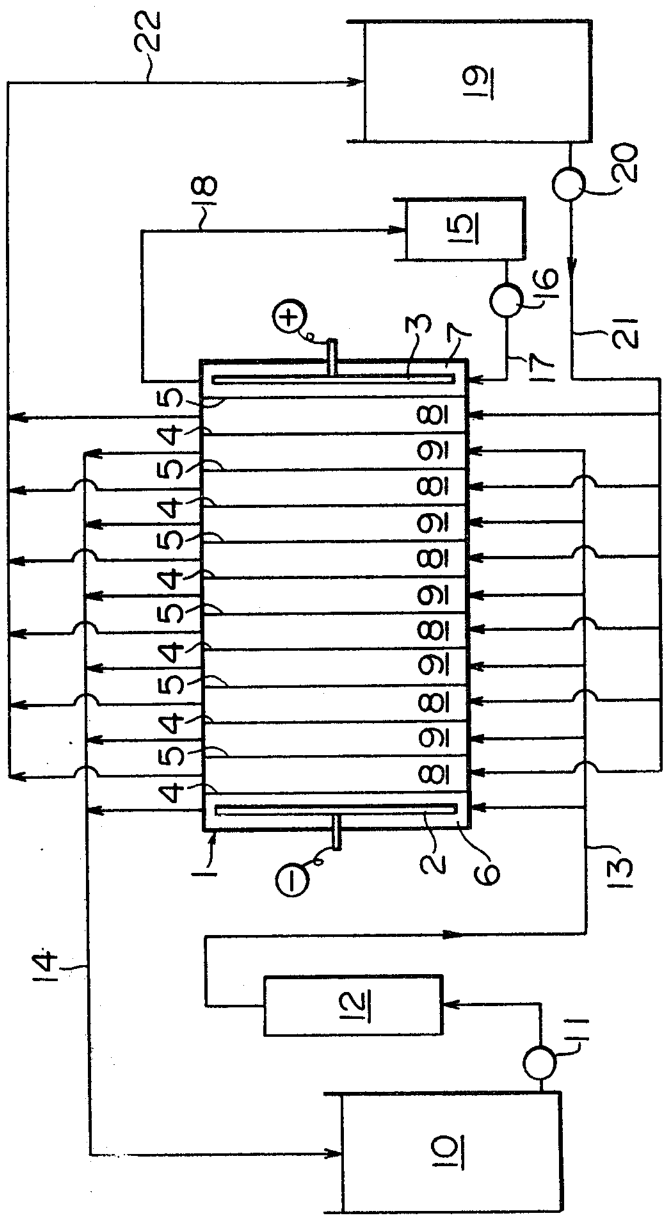
22
19
20
18
15
16
21
17
3
7
1
2
6
13
14
12
11
10

METHOD FOR REGENERATING OXIDIZED PHOTOGRAPHIC DEVELOPERS

This invention relates to a method for regenerating an oxidized photographic developer. In the present application, the term "oxidized photographic developer" is meant to include not only silver halide black-and-white or color photographic developers which have been oxidized by the absorption of oxygen in the air, but also exhausted black-and-white or color photographic developers which have been used for image formation, the latter being generally called waste developers.

Silver halide black-and-white photographic materials, after photographing or print exposure, are processed by a series of steps including processing with a developer, processing with a fixing agent, rinsing and drying to form black-and-white images. Dye image formation on silver halide color photographic materials, in principle, depends upon a series of similar steps including processing with a color developer, processing with a bleaching solution, processing with a fixing agent, rinsing and drying although their processing procedure after photographing or print exposure somewhat differs according to the types of the photographic materials.

Developers for silver halide photographic materials are aqueous solutions generally containing four ingredients, a developing agent, preservative, accelerator and restrainer (inhibitor). The developing agent for black-and-white photographic materials is a chemical which reduces only the area of a silver bromide latent image in the emulsion layer of a photographic material without affecting the other portion, and examples are hydroquinone, methyl para-aminophenol sulfate, and 1-phenyl-3-pyrazolidone. The color photographic developing agent is a chemical which reduces the area of a silver bromide latent image in the emulsion layer of a photographic material and simultaneously undergoes oxidation to become an oxidation product which reacts with the coupler in the emulsion layer to form a dye image. Examples of the color developing agent are N,N-dialkyl-p-phenylenediamine type compounds such as diethyl p-phenylenediamine sulfate, hydroxyethyl ethyl p-phenylenediamine sulfate, 2-amino-5-diethylaminotoluene hydrochloride, 4-amino-N-ethyl-N-($\beta$-methanesulfonamidoethyl)-m-toluidine sesquisulfate monohydrate, and 4-amino-N-hydroxyethyl-N-ethyl-m-toluidine sulfate. The preservative is a chemical which is added to prevent the air oxidation of the developing agent, and examples are sodium sulfite, sodium hydrogen sulfite, sodium metabisulfite, and hydroxylamine sulfate. The accelerator is a chemical which strengthens the reducing action of the developing agent, and includes, for example, alkaline compounds such as sodium hydroxide, sodium carbonate, potassium carbonate, trisodium phosphate and borax. The restrainer is a chemical which strongly restrains the insufficiently exposed portion of a silver halide photographic material to remove fog, and examples are potassium bromide, sodium bromide and potassium oidide. The photographic developer sometimes contains benzyl alcohol, etc. to assist the penetration of the developing agent into the emulsion layer.

The silver halide photographic developers, however, are susceptible to oxidation. For example, when a developer oxidized as a result of being allowed to stand in the air for 2 to 3 weeks is used to process a photographic material after supplementing it with the developing agent and other chemicals to provide the composition of the original developer, the finished photograph has marked staining and reduced resolution.

When a black-and-white photographic material is processed with a developer, the exposed silver image in the material is reduced to silver simultaneously with the oxidation of the developing agent, and the oxidation product of the developing agent and a bromine ion build up in the developer. In the case of processing a color photographic material with a color developer, the exposed silver image in the material is reduced to silver simultaneously with the oxidation of the color developing agent, and a bromine ion dissolves in the color developer. At this time, the oxidized color developing agent reacts with the coupler of the photographic material to form a dye image. However, since the color developing agent is susceptible to air oxidation, a bromine ion and the oxidation product of the developing agent build up also in the color developer.

To the best of the Applicant's knowledge, there has been no report that the problem of the staining or reduced resolution of finished photographs can be solved by regenerating the photographic developer which has been oxidized by the absorption of oxygen in the air, although some methods are known for regenerating spent developers.

Journal of the SMPTE, Vol. 65, pages 478–484 (1956) discloses a method of regenerating a spent or waste developer by passing it through an ion exchange resin to remove a bromine ion. According to this method, the use of a large quantity of the ion exchange resin and the adjustment of the contacting time to several minutes are required to remove the bromine ion selectively while allowing the active ingredients to remain in the spent developer. In actual operation, however, great amounts of the active ingredients tend to be adsorbed to the ion exchange resin even under these conditions. Hence, this method cannot give a solution to the problem of the staining and reduced resolution of finished photographs.

Another known method for regenerating a spent photographic developer is based on the use of an ion exchange membrane-incorporated electrodialytic cell in which the space between the cathode and the anode is partitioned by alternately arranged cation exchange membranes and anion exchange membranes to form a cathode compartment, a plurality of deionation compartments (each of which has a cation exchange membrane on the cathode side and an anion exchange membrane on the anode side), a plurality of enionation compartments (each of which has an anion exchange membrane on the cathode side and a cation exchange membrane on the anode side) and an anode compartment (S. Mizusawa, A. Sasai and N. Mii, Bulletin of the Society of Scientific Photography of Japan, No. 18, 38–44, 1968). The method comprises pouring a waste developer into the deionation compartments and an aqueous solution of sodium sulfate into the cathode compartment, enionation compartments and anode compartment, and passing a direct current across the cathode and the anode to remove a bromine ion in the waste developer. This method is effective for the removal of the bromine ion, but has difficulty in removing the oxidation product of the developing agent and cannot achieve a complete regeneration of the spent developer. Furthermore, when it is desired to remove the bromine ion in the waste developer continuously by the continuous operation of the electrodialytic cell, as the operating time passes, the electrical resistance of the ion exchange membranes increases, and the ability of the electrodialytic cell to remove the bromine ion is reduced. Finally, therefore, the continuous operation of the electrodialytic cell fails.

It is an object of this invention therefore to provide a method for regenerating an oxidized photographic developer to obtain a revived developer which will give finished photographs a good performance with regard to staining, image resolution, fog and so on.

Another object of this invention is to provide a method for regenerating an oxidized photographic developer by an ion exchange membrane-incorporated electrodialytic cell without causing an increase in the electrical resistance of the ion exchange membranes and a reduction in the ability of the cell to remove a bromine ion during the operation.

Still another object of this invention is to provide a method for efficiently regenerating an oxidized photographic developer repeatedly without discarding it after use, so that it can be re-used repeatedly and prevent the pollution of rivers, seas and other water sources by the effluent waste developers.

To achieve these objects, the present invention provides (1) a method which comprises bringing an oxidized photographic developer into contact with an adsorbent material which has affinity for the oxidation product of the developing agent or its derivatives and is substantially insoluble in the developer [method (1)]; and (2) a method which comprises subjecting an oxidized photographic developer to a contacting treatment with an adsorbent material which has affinity for the oxidation product of the developing agent or its derivatives and is substantially insoluble in the developer, and to an electrodialysis treatment using ion exchange membranes [method (2)].

Method (1) of this invention is applicable to photographic developers which have been oxidized by absorption of oxygen in the air, that is photographic developers in which as a result of long-term contact with air during storage or use, the oxidation product of the developing agent and occasionally small amounts of a bromine ion and substances which have dissolved out from the photographic material are accumulated (processing of photographic materials with the oxidized developers causes various inconveniences such as the staining of the finished photograph or its reduced resolution).

Preferred adsorbent materials which can be used in method (1) include, for example, materials having a high surface area, for example in the form of a powder, granule or fiber, which are made of (A) a nitrogen-containing polymeric compound containing at least one nitrogen atom in its main chain or side chains, (B) a polymeric compound containing an epoxy group, (C) a phenolic synthetic resin, (D) a cellulose acetate, or (E) activated carbon.

Foamed materials made of (A), (B), (C) or (D) are also suitable adsorbent materials. Materials of forms having a low surface area, such as films or sheets, are not preferred since their efficiency of contact with developers is low.

Examples of the nitrogen-containing polymeric compound (A) include polyamides such as nylon 6, nylon 66 and nylon 610; polyurethanes such as a polyadduct of hexamethylene diisocyanate and tetramethylene glycol and a polyadduct of tolylene diisocyanate with polypropylene glycol; polyurea; polypeptides such as natural silk or wool; a urea-formaldehyde resin; a melamine-formaldehyde resin; a hydrazide-containing polymeric compound obtained by reacting a sulfonated produce of a styrene/divinylbenzene copolymer with hydrazine; a hydrazide-containing polymeric compound obtained by reacting a chlorosulfonated product of polystyrene or an epoxy resin with hydrazide; and a polymeric compound containing an alkylamino group obtained by reacting a chlorosulfonated product of polystyrene with an amine such as stearylamine.

An epoxy resin synthesized from bisphenol A and epichlorohydrin in the presence of an alkali is an example of the epoxy-containing polymeric compound (B).

A phenol-formaldehyde condensate and the like can be cited as the phenolic synthetic resin (C).

Examples of the cellulose acetate (D) are triacetyl cellulose and diacetyl cellulose.

All commercially available grades of the activated carbon (E) can be used in the present invention.

The adsorbent materials should have affinity (namely, should be physically or chemically adsorptive) for the oxidation product of the developing agent or its derivatives, and should be insoluble in the developer. Desirably, the adsorbent materials should not contain low-molecular-weight compounds which dissolve in the developer as impurities or foreign matters.

Contacting of the oxidized developer with the adsorbent material can be performed by various procedures, for example by dipping the adsorbent material in the oxidized developer; or passing the oxidized developer through a column packed with the adsorbent materials; or mixing the oxidized developer and the adsorbent material, stirring the mixture, and after a certain period of time, filtering it by a filter.

The adsorbent materials (A), (B), (C), (D) and (E) may be used singly or as mixture of two or more. The amount of the adsorbent material used is about 0.1 to 10 g per liter of the oxidized developer. The contacting temperature is room temperature, and the contacting time is sufficiently from about 5 minutes to about 10 hours.

By contact with the adsorbent material, the oxidized developer is regenerated. The revived developer is reused either as such or after supplementing it with necessary ingredients to provide the same composition as the original developer, and if desired, adding an alkali or acid for pH adjustment.

Treatment of the oxidized developer by method (1) reduces the coloration of the developer. When this developer is used to process a photographic material, the staining and reduced resolution of the finished photograph are greatly obviated. The staining and reduced resolution can be further obviated by applying the method (1) to the developer in use which has not been oxidized to a great extent.

It is not entirely clear why the contacting of the developer with the adsorbent material by the method (1) produces such good results. But it is presumed that the adsorbent material adsorbs the oxidation product of the developing agent which has to do with the coloration of the developer and the staining and reduced resolution of the finished photograph.

Method (2) of the present invention can be applied to "waste developers" which are developers oxidized as a result of use in processing photographic materials for image formation and in which a bromine ion, the oxidation product of the developing agent, and substances dissolved out from the photographic materials have built up.

In the method (2) of the invention, a material made of an anion exchanger (F) can also be used as the adsorbent in addition to the materials made of (A), (B), (C), (D) or (E).

The anion exchange (F) includes organic and inorganic anion exchangers. Any desired substances can be used as the organic anion exchanger, but anion exchange resins containing a quaternary nitrogen atom are especially preferred. Basic dolomite is an example of the inorganic anion exchanger. The anion exchanger may be in any desired form such as fibers, powders or granules. Especially preferably, it is porous with a high surface area.

The use of anion exchangers as the adsorbent material brings about an effect of preventing a rise in the electrical resistance of the ion exchange membranes and a reduction in the ability of the electrodialytic cell to remove a bromine at the time of electrodialysis. It also produces such an effect that the revived developer gives finished photographs of good performance. The anion exchanger has an action of permitting the adsorption of not only the oxidation product of a developing agent but also those substances which have dissolved out from the photographic material into the developer, for example an antifoggant such as benzotriazole and benzoimidazole. Since it also has an action of permitting the adsorption of the developing agent, the conditions for the use of the anion exchanger, especially its amount and the contacting time, should be strictly controlled within the ranges to be described below. The contacting time, however, may be more than 10 hours, if desired.

The method of contacting the adsorbent material with a waste photographic developer, the amount of the adsorbent used, and the contacting temperature and time in method (2) are quite the same as in method (1) described hereinabove.

The adsorbent material may be one or a mixture of the materials (A), (B), (C), (D), (E) and (F).

The electrodialysis treatment using ion exchange membranes in method (2) is described by referring to a developer regenerating apparatus shown in the accompanying drawing.

In the drawing, the reference numeral 1 represents an electrodialytic cell including ion exchange membranes. By partitioning the space between a cathode 2 and an anode 3 by means of alternately arranged anion exchange membranes 4 and cation exchange membranes 5, a cathode compartment 6, an anode compartment 7, a plurality of enionation compartments 8 (each of which has an anion exchange membrane on the cathode side and a cation exchange membrane on the anode side) and a plurality of deionation compartments 9 (each of which has a cation exchange membrane on the cathode side and an anion exchange membrane on the anode side) are formed. The reference numeral 10 represents a tank for a waste developer, and the waste developer stored in this tank is circulated by a pump 11 to the cathode compartment 6 and the deionation compartments 9 through a tank 12 packed with the adsorbent material and circulating pipe lines 13 and 14. The reference numeral 15 represents a tank for the anolyte solution. The electrolyte solution stored in this tank is circulated by a pump 16 to the anode compartment 7 through circulating pipe lines 17 and 18. The reference numeral 19 represents a tank for the solution to be introduced into the enionation compartments. The electrolyte solution stored in this tank is circulated by a pump 20 in the enionation compartments 8 through circulating pipe lines 21 and 22.

In the electrodialytic treatment using ion exchange membranes in accordance with the method (2) of this invention, the removal of a bromine ion in the waste developer and the reduction of the oxidation product of the developing agent are performed by circulating the waste developer through the cathode compartment 6 and the deionation compartments 9 of the electrodialytic cell, pouring an electrolyte solution into the anode compartment 7 and the enionation compartments 8, and passing a direct current across the cathode 2 and the anode 3. Alternatively, the bromine ion in the waste developer can be removed by pouring the waste developer into the deionation compartments 9 of the electrodialytic cell 1, and an electrolyte solution into the cathode compartment 6, the anode compartment 7 and the enionation compartments 8, and passing a direct current between the cathode 2 and the anode 3.

The electrodialytic cell, the tanks and the pipe lines may be made of such materials as polyvinyl chloride, polyethylene, polypropylene, and rubber-lined iron. Materials for the cathode 2 may, for example, be iron, nickel, lead, zinc, and stainless steel. Platinum, platinum-plated titanium, graphite, and the like can be cited as materials for the anode 3. Suitable anion exchange membranes are of the strong base type, and the cation exchange membranes are desirably of the strong acid type.

Examples of the electrolyte solution to be poured into the anode compartment 7 and the enionation compartments 8, or the electrolyte solution to be poured in the aforesaid alternative method into the cathode compartment 6, the anode compartment 7 and the enionation compartments 8 are alkaline solutions such as solutions of sodium hydroxide or potassium hydroxide, solutions of salts such as sodium sulfate, and solutions of acids such as sulfuric acid. Sufficiently, the concentration of the electrolyte solution is 0.1 to 1N.

Other halogen ions such as an iodine or chlorine ion sometimes build up in the waste silver halide photographic developer in addition to the bromine ion. But these ions do not pose a problem since they are also removed by the electrodialysis treatment described hereinabove.

In performing the method (2) of this invention, it is desirable as shown in the drawing to contact the waste developer with the adsorbent material, and then to subject it to the electrodialysis treatment. If desired, however, the adsorbing treatment and the electrodialysis treatment may be performed simultaneously. Alternatively, when it is desired to regenerate and reuse the developer repeatedly, the adsorbing treatment may be performed after the electrodialysis treatment.

When the waste developer contacted with the adsorbing material is electrodialyzed, the current density at the ion exchange membranes should preferably be adjusted to 0.02 to 1.2 $A/dm^2$. If the waste developer is electrodialyzed at the above current density without prior contacting with the adsorbent material, the cell voltage abruptly increases, and the ability of the electrodialytic cell to remove a bromine ion is abruptly reduced. However, if the waste developer is first contacted with the adsorbent material and then electrodialyzed, scarcely any increase in cell voltage and any reduction in the ability of the electrodialytic cell to remove a bromine ion occur during the operation.

The waste developer is regenerated by subjecting it to both the contacting with the adsorbent material and to the electrodialysis treatment using ion exchange membranes. The revived developer is reused either as such or after supplementing it with lacking ingredients to provide the same composition as the original developer, and if desired, adding an alkali or acid for pH adjustment.

According to the method (2) of this invention, neither an increase in the electric resistance of the ion exchange membranes nor a decrease in the speed of removing the bromine ion is caused at the time of removing the bromine ion in the waste developer by electrodialysis using ion exchange membranes. Hence, the electrodialysis can be performed continuously with good efficiency. Black-and-white or color photographs obtained by processing with the developer regenerated by this method have a good performance in regard to staining, resolution, fog and so on.

It is not entirely clear why the method (2) of this invention can prevent the increase with time of the electrical resistance of ion exchange membranes. But it is presumably because the adsorbent material adsorbs very small amounts of ingredients in the waste developer which will contaminate the ion exchange membranes.

The methods of this invention can be applied to both black-and-white and color developers. The present invention enables oxidized photographic developers to be regenerated stably and permits a great saving of developer chemicals. It also offers a solution to the problem of environmental pollution by effluent waste developers.

The following Examples illustrate the present invention in more detail.

EXAMPLE 1

A color developer for color paper having the composition shown in column (I) of Table 1 was exposed to the air for 3 weeks. It was oxidized, and its composition was changed to that shown in column (II) of Table 1. Two grams, per liter of the oxidized color developer, of each of the adsorbent materials shown in Table 2 was added to the oxidized color developer. The mixture was stirred at room temperature for 2 hours, and the adsorbent material was removed by filtration.

The analytical values of each of the developers after contact with the adsorbent materials are shown in column (I) of Table 2. In Table 2, column (I), CD-3 refers to the color developing agent [4-amino-N-ethyl-N-(β-methanesulfonamidoethyl)-m-toluidine sesquisulfate monohydrate) shown in Table 1]. In Table 2, column (I), the α-naphthol method refers to a method of indirect quantitative determination of the oxidation product of CD-3 (quinone monoimine and quinone diimine) which comprises adding 0.3 g of α-naphthol of 30 ml of the developer, adjusting its pH to 6.5 with 1N hydrochloric acid, extracting the mixture with 50 ml of butyl acetate, and measuring the absorbance of the extract. The absorbance at 487 mμ corresponds to quinone monoimine, and the absorbance at 627 mμ, to quinone diimine.

Chemicals are added to each of the developers after contact with the adsorbent materials so as to provide the compositions shown in Table 1, column (I), and the pH of each of the mixed solutions was adjusted to 10.20. Using the revived developers, color papers were developed, and the results obtained are shown in Table 2, column (II).

The results shown in Table 2, columns (I) and (II) demonstrate that the color developers treated by the method (1) of this invention have reduced coloration and a decreased content of the oxidation product of the color developing agent, and that their ability to prevent the staining and reduced resolution of the finished photographs was restored to that before undergoing oxidation.

Table 1

| Composition | (I) Color Developer | (II) Oxidized color developer |
|---|---|---|
| 4-Amino-N-ethyl-N-(β-methanesulfonamidoethyl)-m-toluidine sesquisulfate monohydrate (g/l) (CD-3; a trademark for a product of Eastman Kodak Co.) | 4.5 | 4.0 |
| Anhydrous sodium sulfite (g/l) | 1.5 | 1.2 |
| Hydroxylamine sulfate (g/l) | 3.0 | 2.3 |
| Anhydrous potassium carbonate (g/l) | 40.0 | 40.0 |
| Benzyl alcohol (ml/l) | 15.0 | 13.0 |
| Bromine ion (g/l) | 0.35 | 0.35 |
| pH | 10.20 | 10.17 |
| Absorbance (450 mμ = | 0.08 | 0.23 |

Table 2

| | (I) Analytical values for the developer | | | |
|---|---|---|---|---|
| | | Absorb-ance | α-Naphthol method | |
| Absorbent material | CD-3 (g/l) | (450 mμ) | (487 mμ) | (627 mμ) |
| None (color developer) | 4.5 | 0.08 | 0.12 | 0.15 |
| None (oxidized color developer) | 4.0 | 0.23 | 0.20 | 0.25 |
| Nylon 6 (fibers) | 3.9 | 0.10 | 0.13 | 0.16 |
| Polyurethane (foam) | 3.8 | 0.11 | 0.14 | 0.17 |
| Polyurea (fibers) | 3.8 | 0.10 | 0.15 | 0.17 |
| Wool (fibers) | 3.8 | 0.13 | 0.15 | 0.17 |
| Urea-formaldehyde resin (granules) | 3.8 | 0.12 | 0.14 | 0.16 |
| Melamine-foamaldehyde resin (granules) | 3.9 | 0.13 | 0.13 | 0.17 |
| Sulfohydrazide-containing polystyrene (fibers) | 3.8 | 0.09 | 0.13 | 0.15 |
| Epoxy resin (granules) | 3.8 | 0.09 | 0.14 | 0.16 |
| Phenol-formaldehyde resin | | | | |

Table 2-continued

| | | | | |
|---|---|---|---|---|
| (granules) | 3.8 | 0.11 | 0.15 | 0.17 |
| Triacetyl cellulose (fibers) | 3.8 | 0.12 | 0.14 | 0.16 |
| Triacetyl cellulose (film) | 3.9 | 0.27 | 0.22 | 0.26 |
| Activated carbon (granules) | 3.8 | 0.08 | 0.13 | 0.16 |

| Adsorbent material | (II) Results of development | | | | | Remarks |
|---|---|---|---|---|---|---|
| | Fog optical density | | | Stain-ing | Reso-lution | |
| | Cyan | Magenta | Yellow | | | |
| None (color developer) | 0.09 | 0.09 | 0.09 | None | Good | Referential Example; see Table 1 |
| None (oxidized color developer) | 0.12 | 0.13 | 0.12 | Much | Poor | " |
| Nylon 6 (fibers) | 0.09 | 0.09 | 0.09 | None | Good | " |
| Polyurethane (foam) | 0.10 | 0.10 | 0.09 | " | " | " |
| Polyurea (fibers) | 0.09 | 0.09 | 0.10 | " | " | " |
| Wool (fibers) | 0.10 | 0.10 | 0.10 | " | " | " |
| Urea-formaldehyde resin (granules) | 0.09 | 0.10 | 0.10 | " | " | " |
| Melamine-formaldehyde resin (granules) | 0.09 | 0.10 | 0.10 | " | " | " |
| Sulfohydrazide-containing poly-styrene (fibers) | 0.09 | 0.09 | 0.10 | " | " | " |
| Epoxy resin (granules) | 0.10 | 0.10 | 0.10 | " | " | " |
| Phenol-formaldehyde resin (granules) | 0.09 | 0.10 | 0.10 | " | " | " |
| Triacetyl cellulose (fibers) | 0.09 | 0.09 | 0.09 | " | " | " |
| Triacetyl cellulose (film) | 0.13 | 0.15 | 0.14 | Much | Poor | Comparison |
| Activated carbon (granules) | 0.09 | 0.09 | 0.09 | None | Good | Method (1) of the invention |

EXAMPLE 2

Color papers were developed by feeding a color developer having the composition shown in Table 3, column (I) into a developer tank of a color paper processing machine. The waste color developer discharged from the developer tank had the composition shown in Table 3, column (II). Forty liters of this waste developer was filled into a tank 10 of a developer regenerating apparatus of the type shown in the accompanying drawing. The waste developer was circulated from tank 12 packed with adsorbent material to cathode compartment 6 and deionation compartments 9 of electrodialytic cell 1 through circulating pipe lines 13 and 14. Anolyte solution tank 15 was filled with 10 liters of a 15 g/l sodium sulfate solution, which was circulated in anode compartment 7 through circulating pipe lines 17 and 18. Tank 19 for a solution of the enionation compartments was filled with 20 liters of a 15 g/l sodium sulfate solution which was circulated in enionation compartments 8 through circulating pipe lines 21 and 22. A direct current was passed across the anode and the cathode so that the current density at the ion exchange membranes became 0.25 A/dm$^2$ to electrodialyze the waste developer batchwise.

The electrodialytic cell 1 consisted of one cathode compartment, one anode compartment, eleven enionation compartments and eleven deionation compartments as a result of partitioning the space between nickel cathode 2 and platinum-plated titanium anode 3 by twelve strong base-type anion exchange membranes 4 and twelve strong acid-type cation exchange membranes 5 which were disposed alternately.

The tank 12 was packed with 2 g, per liter of the waste developer, of each of the various adsorbent materials shown in Table 4.

The batch operation described above was terminated when the bromine ion concentration of the waste developer (40 liters) became 0.10 g/liter. The cell voltage at the end of the batchwise operation, and the time required from the initiation to the end of the operation (the time required for one batch) were as shown in Table 4.

Table 4 demonstrates that according to the method (2) of the present invention, an increase in the cell voltage of the electrodialytic cell scarcely occurred with time, and even after operation for long periods of time, the ability of the electrodialytic cell was not reduced.

The waste developer which was subjected to the contacting treatment with nylon 6 fibers and the electrodialysis treatment had the composition shown in Table 3, column (III). Chemicals in the amounts shown in Table 3, column (IV) were added to provide a revived color developer having the composition shown in Table 3, column (V). The revived developer was then fed into the color paper processor. The finished color paper by this development was substantially free from staining and had a good resolution.

Table 3

| Composition | (I) Color developer | (II) Waste developer | (III) After treat-ment | (IV) Chemicals replenished | (V) Revived color developer |
|---|---|---|---|---|---|
| 4-Amino-N-ethyl-N-(β-methanesulfonamido-ethyl)-m-toluidine sesquisulfate mono-hydrate (g/l) | 5.5 | 4.5 | 4.3 | 1.2 | 5.5 |
| Anhydrous sodium sulfite (g/l) | 2.0 | 1.5 | 1.3 | 0.7 | 2.0 |

Table 3-continued

| Composition | (I) Color developer | (II) Waste developer | (III) After treat-ment | (IV) Chemicals replenished | (V) Revived color developer |
|---|---|---|---|---|---|
| Hydroxylamine sulfate (g/l) | 4.0 | 3.5 | 3.3 | 0.7 | 4.0 |
| Anhydrous potassium carbonate (g/l) | 40.0 | 40.0 | 38.0 | 2.0 | 40.0 |
| Benzyl alcohol (g/l) | 15.0 | 15.0 | 14.7 | 0.3 | 15.0 |
| Bromine ion (g/l) | 0.10 | 0.35 | 0.10 | — | 0.10 |
| pH | 10.35 | 10.20 | 10.25 | — | 10.35 |

Table 4

| Adsorbent material | Batch 1 | 5 | 10 | 20 | 30 | 60 | 90 | Remarks |
|---|---|---|---|---|---|---|---|---|
| None | 5.0 | 12.0 | 31.2 | (stop- | | | | |
| | (20) | (35) | (80) | ped) | | | | Comparison |
| Nylon 6 (fibers) | 5.0 | 5.1 | 5.2 | 5.0 | 4.9 | 5.0 | 4.8 | Method (2) of |
| | (20) | (20) | (20) | (20) | (21) | (20) | (20) | the invention |
| Polyurethane (fibers) | 5.1 | 5.2 | 4.9 | 4.8 | 5.0 | 5.0 | 5.1 | " |
| | (20) | (19) | (20) | (19) | (21) | (20) | (20) | |
| Polyurea (fibers) | 4.9 | 5.1 | 5.0 | 4.8 | 5.0 | 5.0 | 4.9 | " |
| | (20) | (20) | (19) | (20) | (21) | (21) | (20) | |
| Wool (fibers) | 5.1 | 5.0 | 5.1 | 4.9 | 4.9 | 5.1 | 5.0 | " |
| | (21) | (20) | (20) | (19) | (20) | (21) | (20) | |
| Urea-formaldehyde resin | 5.0 | 5.1 | 4.9 | 4.8 | 5.2 | 5.1 | 5.0 | " |
| (granules) | (20) | (20) | (21) | (20) | (20) | (21) | (20) | |
| Melamine-formaldehyde | 5.0 | 5.2 | 4.9 | 4.8 | 5.0 | 5.1 | 5.1 | " |
| resin (granules) | (19) | (21) | (20) | (19) | (20) | (20) | (21) | |
| Sulfohydrazide-containing | 5.1 | 5.1 | 5.0 | 5.1 | 4.9 | 4.8 | 4.9 | " |
| polystyrene (fibers) | (20) | (21) | (19) | (20) | (20) | (19) | (20) | |
| Epoxy resin (granules) | 5.0 | 5.1 | 4.8 | 5.1 | 5.4 | 5.0 | 5.0 | " |
| | (20) | (21) | (20) | (20) | (20) | (20) | (19) | |
| Phenol-formaldehyde | 5.0 | 5.1 | 5.0 | 4.8 | 4.9 | 5.0 | 5.1 | Method (2) of |
| resin (granules) | (21) | (19) | (20) | (20) | (21) | (20) | (20) | the invention |
| Triacetyl cellulose | 5.1 | 5.1 | 5.0 | 5.0 | 5.0 | 5.1 | 4.9 | " |
| (fibers) | (20) | (21) | (20) | (20) | (19) | (21) | (20) | |
| Triacetyl cellulose | 4.9 | 6.5 | 14.0 | 31.5 | (stop- | | | Comparison |
| (film) | (20) | (25) | (40) | (75) | ped) | | | |
| Activated carbon | 5.0 | 5.1 | 5.0 | 5.0 | 4.9 | 4.9 | 5.0 | Method (2) of |
| (granules) | (20) | (20) | (21) | (19) | (20) | (20) | (20) | the invention |
| Quaternary nitrogen-type anion exchange resin | 5.1 | 5.0 | 5.1 | 5.0 | 4.9 | 5.0 | 5.0 | " |
| (granules) | (20) | (21) | (20) | (20) | (21) | (20) | (20) | |

Note: The figures in the upper row in each batch show the cell voltages (volts), and the figures in the parentheses show the time (hours) required for one batch.
"Stopped" means that since the cell voltage became very high and the time required for one batch became very long, it was judged that the cell had no more ability to perform regeneration, and its operation was stopped.

EXAMPLE 3

A developer having the composition shown in Table 5, column (I) was fed into a black-and-white film processor, and black-and-white films were developed. The waste developer discharged from the processor had the composition shown in Table 5, column (II). Twenty liters of the waste developer was filled into tank 10 of a developer regenerating apparatus of the type shown in the accompanying drawing. The waste developer was circulated from tank 12 filled with adsorbent material to cathode compartment 6 and deionation compartments 9 of electrodialytic cell 1 through circulating pipe lines 13 and 14. Tank 15 for an anolyte solution was filled with 10 liters of a sodium sulfate solution (15 g/l) which was circulated to anode compartment 7 through circulating pipe lines 17 and 18. Tank 19 for a solution of enionation compartments was filled with 20 liters of a sodium sulfate solution (15 g/l) which was circulated to enionation compartments 8 through circulating pipe lines 21 and 22. A direct current was passed across the cathode and the anode so that the current density at the ion exchange membranes became 0.20 A/dm$^2$ to electrodialyze the waste developer batchwise.

The electrodialytic cell 1 used was of the same type as that used in Example 2, and 2 g, per liter of the waste developer, of each of the various adsorbent materials shown in Table 6 was filled into the tank 12.

The batch operation described above was terminated when the bromine ion concentration of the waste developer (20 liters) became 0.50 g/l. The cell voltage at the end of the operation and the time required from the initiation to the end of the operation (the time required for one batch) were as shown in Table 6.

Table 6 demonstrates that according to the method (2) of this invention, a rise in the cell voltage of the electrodialytic cell with time scarcely occurred, and the ability of the electrodialytic cell after long-term operation was not reduced.

The waste developer which was subjected to the contacting treatment with nylon 6 fibers and to the electrodialyzing treatment had the composition shown in Table 5, column (III). Chemicals in the amounts shown in Table 5, column (IV) were added to the revived developer to form a revived black-and-white developer having the composition shown in Table 5, column (V), which was then fed into the black-and-white processor. The finished black-and-white film in this development was substantially free from staining, and had a good resolution.

Table 5

| Composition | (I) Black-and-white developer | (II) Waste developer | (III) After treatment | (IV) Chemicals replenished | (V) Revived black-and-white developer |
|---|---|---|---|---|---|
| Hydroquinone (g/l) | 7.0 | 5.5 | 5.0 | 2.0 | 7.0 |
| 1-Phenyl-3-pyrazolidone (g/l) | 0.30 | 0.30 | 0.29 | 0.01 | 0.30 |
| Anhydrous sodium sulfate (g/l) | 100 | 90 | 87 | 13 | 100 |
| Borax (g/l) | 3.0 | 2.5 | 2.3 | 0.7 | 0.3 |
| Bromine ion (g/l) | 0.5 | 1.5 | 0.5 | — | 0.5 |
| pH | 8.60 | 8.50 | 8.55 | — | 8.60 |

Table 6

| Adsorbent material | Batch 1 | 5 | 10 | 20 | 30 | 60 | 90 | Remarks |
|---|---|---|---|---|---|---|---|---|
| None | 6.1 (20) | 15.5 (40) | 36.0 (100) | (stopped) | | | | Comparison |
| Nylon 6 (fibers) | 5.9 (20) | 6.0 (20) | 6.1 (20) | 6.0 (21) | 5.8 (21) | 5.8 (20) | 5.8 (20) | Method (2) of the invention |
| Polyurethane (foam) | 6.1 (20) | 6.1 (20) | 6.0 (19) | 5.9 (20) | 6.2 (20) | 6.1 (21) | 6.0 (20) | " |
| Polyurea (fibers) | 5.8 (20) | 5.7 (20) | 5.9 (20) | 6.0 (21) | 5.8 (20) | 5.8 (20) | 5.8 (20) | " |
| Wool (fibers) | 5.9 (20) | 6.0 (20) | 6.1 (20) | 5.8 (20) | 5.8 (20) | 5.9 (20) | 6.0 (21) | " |
| Urea-formaldehyde resin (granules) | 6.0 (20) | 5.9 (20) | 6.1 (19) | 5.9 (19) | 6.0 (20) | 6.1 (20) | 6.0 (20) | " |
| Melamine-formaldehyde resin (granules) | 6.1 (20) | 6.0 (20) | 5.9 (19) | 5.8 (19) | 6.0 (20) | 6.1 (20) | 6.0 (20) | " |
| Sulfohydrazide-containing polystyrene (fibers) | 6.1 (20) | 5.9 (20) | 6.0 (19) | 5.9 (20) | 5.9 (20) | 6.0 (20) | 6.0 (21) | " |
| Polymeric compound obtained by reacting a chlorosulfonated product of polystyrene with stearylamine (fibers) | 6.0 (20) | 6.0 (20) | 6.1 (20) | 6.2 (21) | 6.1 (21) | 6.0 (20) | 5.9 (20) | Method (2) of the invention |
| Epoxy resin (granules) | 6.1 (20) | 6.1 (20) | 6.0 (20) | 5.9 (19) | 5.8 (19) | 6.0 (20) | 6.1 (20) | " |
| Phenol-formaldehyde resin (granules) | 6.1 (20) | 6.0 (20) | 6.0 (20) | 5.9 (20) | 6.0 (21) | 5.9 (20) | 6.1 (20) | " |
| Triacetyl cellulose (fibers) | 6.0 (20) | 6.0 (21) | 6.1 (21) | 6.2 (20) | 6.1 (20) | 6.0 (20) | 5.9 (20) | " |
| Triacetyl cellulose (film) | 5.8 (20) | 9.0 (28) | 16.0 (40) | 37.0 (105) | (stopped) | | | Comparison |
| Activated carbon (granules) | 6.0 (20) | 5.8 (20) | 5.7 (20) | 5.7 (19) | 6.1 (20) | 5.8 (20) | 5.9 (20) | Method (2) of the invention |
| Quaternary nitrogen-type anion exchange resin (granules) | 6.0 (20) | 6.1 (21) | 6.1 (20) | 6.0 (21) | 5.9 (20) | 5.9 (20) | 6.0 (20) | " |

Note: Same as the footnote to Table 4.

What we claim is:

1. A method for regenerating an oxidized photographic developer, which comprises subjecting the oxidized developer to a contacting treatment with an adsorbent material which has affinity for the oxidation product of the developing agent or its derivatives and is substantially insoluble in the developer, and to an electrodialysis treatment using ion exchange membranes.

2. The method of claim 1 wherein the adsorbent material is a material in the form of a powder, granule, fiber or foam which is made of a nitrogen-containing polymeric compound containing at least one nitrogen atom in its main chain or side chains, a polymeric compound containing an epoxy group, a phenolic synthetic resin or a cellulose acetate.

3. The method of claim 1 wherein the adsorbent material is activated carbon in the form of a powder, granule or fiber.

4. The method of claim 1 wherein the adsorbent material is an anion exchanger in the form of a powder, granule or fiber.

5. The method of claim 1 wherein the electrodialyzing treatment is performed while maintaining the current density at the ion exchange membranes at 0.02 to 1.2 A/$dm^2$.

* * * * *